United States Patent [19]
Bauder

[11] 3,981,192
[45] Sept. 21, 1976

[54] FLUID PRESSURE SENSING APPARATUS
[75] Inventor: Carl J. Bauder, Syracuse, N.Y.
[73] Assignee: Cambridge Filter Corporation, Syracuse, N.Y.
[22] Filed: May 23, 1975
[21] Appl. No.: 580,152

[52] U.S. Cl. .................................................. 73/212
[51] Int. Cl.² ........................................... G01F 1/46
[58] Field of Search .............. 73/147, 182, 183, 212

[56] References Cited
UNITED STATES PATENTS

| | | | |
|---|---|---|---|
| 1,250,238 | 12/1917 | Spitzglass | 73/212 |
| 3,685,355 | 8/1972 | DeBaum | 73/212 |
| 3,751,982 | 8/1973 | Lambert | 73/212 |
| 3,768,301 | 10/1973 | Feichtinger | 73/212 |

FOREIGN PATENTS OR APPLICATIONS

| 724,276 | 2/1955 | United Kingdom | 73/212 |
|---|---|---|---|

Primary Examiner—Herbert Goldstein
Attorney, Agent, or Firm—Charles S. McGuire

[57] ABSTRACT

Pressure of a fluid within an enclosed duct is transmitted to a manifold tube by a U-shaped sensing probe, having openings in or adjacent each free end. The probe is attached at the mid-point between the legs to the manifold tube at a single opening in the latter and sealed in air tight engagement about the periphery of the manifold tube opening. Both ends of the probe communicate pressure to the interior of the manifold through a single opening at the mid-point of the U which is small with respect to the interior area of the manifold and with respect to the size of the manifold opening at which the probe is attached.

9 Claims, 6 Drawing Figures

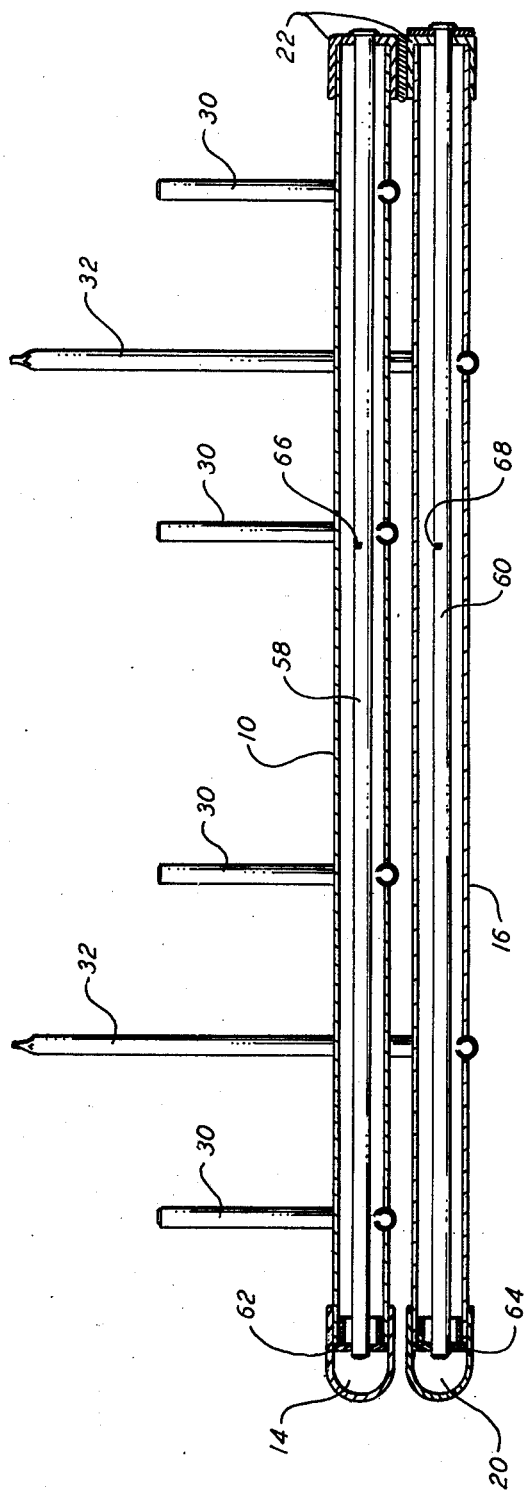
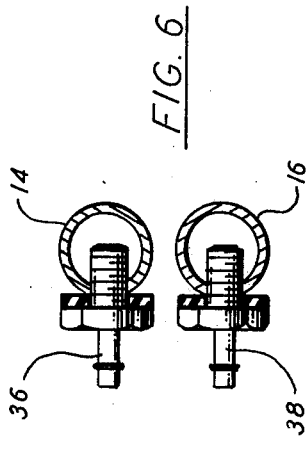

FLUID PRESSURE SENSING APPARATUS

BACKGROUND OF THE INVENTION

The present invention relates to pressure sensing apparatus and, more particularly, to novel structures of pressure sensing probes communicating with a manifold.

In systems for measuring fluid flow through an enclosed duct or conduit it is sometimes necessary or desirable to sense the pressure of the fluid at a plurality of locations and to communicate the pressure from each location to a common manifold. Both the pressure sensing means and the manifold are commonly in the form of a hollow tube, the manifold of course being of significantly larger diameter.

An example of the general type of prior art apparatus wherein the present invention may be advantageously employed is found in U.S. Pat. No. 3,685,355, wherein pressure measuring apparatus is permanently installed in a duct through which air flows in one direction. Total pressure is sensed at a number of locations in a transverse plane of the duct by impact tubes having open ends towards which the air flow is directed. From the open end each tube extends in the direction of air flow and is then bent at approximately 90° and inserted in a drilled opening in the manifold tube. The impact tube is of the same inside diameter from the open end to the end communicating with the manifold.

In other prior art devices, the impact tubes may extend straight from the manifold, in the upstream direction of fluid flow, without being bent. The arrangement of sensing tubes in the aforementioned patent offers the advantage of allowing more sensor tip locations for a single manifold. However, a drilled opening in the manifold and separate connecting operation is required for each impact tube, i.e., for each sensing location.

SUMMARY OF THE INVENTION

It is a principal object of the present invention to provide a pressure sensing probe construction in association with a manifold wherein two sensing locations are provided for each opening in the manifold wall through which the sensors and manifold communicate.

A further object is to provide a novel combination of pressure sensing probe and manifold tube wherein the size of the opening through which the probe and manifold communicate may be easily established in proportion to the internal volume of the manifold.

Another object is to provide a construction of pressure sensing probe fixedly attached to a manifold tube wherein the opening through which the probe communicates with the manifold is isolated from the area of fixed attachment of the probe and manifold.

In accordance with the foregoing objects, the invention employs sensing probes in the form of hollow, U-shaped tubes, each having a pair of legs with open ends connected by a medial section. A cutting tool having a radius equal to that of the outside of the probes is used to make an opening in the manifold wall to a depth approximately equal to such radius for each probe to be attached. The probes are provided with a drilled opening through the wall of the medial section at the mid-point between the open ends at the terminus of each leg of the probe. The size of this opening is substantially smaller than the opening in the manifold wall, whereby the probe may be placed in contact with the periphery of the manifold opening, with the drilled opening in the probe lying well within such periphery.

The interior of the probe thus communicates with the interim of the manifold through the drilled opening. The probe and manifold are sealed in airtight engagement by soldering, for example, about the periphery of the opening in the manifold wall. The probes may communicate either total or static pressure from within the duct to the interior of the manifold, the probe ends being closed in the case of static pressure sensing, as explained later in more detail. In any case, pressure is communicated through both legs of each probe to the manifold through a single opening in both the manifold and probe. The invention is disclosed as employed in a pressure measurement system set forth in copending application Ser. No. 580,153, of Roger T. Goulet, filed of even date herewith and assigned to applicant's assignee.

BRIEF DESCRIPTION OF THE DRAWINGS

FIG. 3 is an elevational view in section on the line 3—3 of FIG. 1; and

FIGS. 4, 5 and 6 are further elevational views in section on the lines 4—4, 5—5 and 6—6, respectively, of FIG. 1.

DETAILED DESCRIPTION

Figure 1:
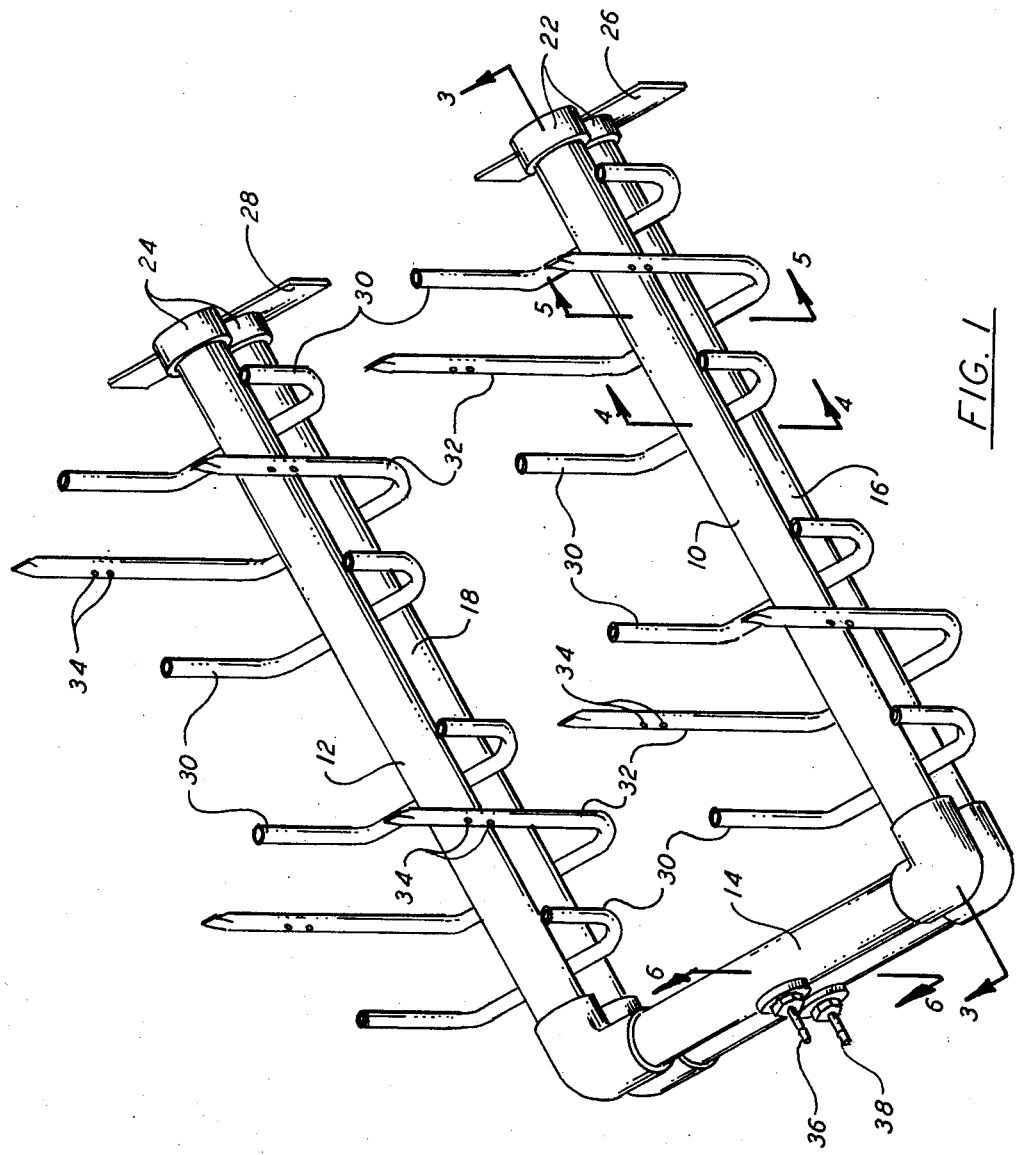
FIG. 1 is a perspective view of pressure sensing apparatus constructed according to the present invention.

Referring now to the drawings, in FIG. 1 is shown a first pair of hollow manifold tubes 10 and 12, substantially parallel to one another and joined at one end of each by suitable elbows, or the like, to connecting manifold tube 14. Closely adjacent and parallel to each of the first pair of tubes is a second pair of hollow manifold tubes 16 and 18, likewise joined at one end by connecting manifold 20. The ends of tubes 10 and 16 opposite the connections thereof to connecting manifolds 14 and 20, respectively, are closed by end caps 22. Similar end caps 24 close the corresponding ends of tubes 12 and 18. The end caps on tubes 16 and 18 are provided with fixed brackets 26 and 28 for mounting the apparatus within a duct, as will be later apparent.

Secured to each of tubes 10 and 12 are a plurality of U-shaped, hollow tubes or probes 30, of substantially smaller diameter than the manifold tubes to which they are connected. The ends of probes 30 are open at the terminus of each leg of the U, so that the probes may function as impact tubes in the intended application, as explained later herein, to sense total pressure in a fluid stream moving towards the open ends. A plurality of U-shaped, hollow probes 32 are connected to each of manifold tubes 16 and 18. Both ends of probes 32 are closed, one or more openings 34 being provided in the probe walls a short distance from the closed end of each leg, whereby probes 32 may sense static pressure of the fluid stream. Holes 34 must be free from burrs or other projections and perpendicular to air flow for optimum operation, in accordance with conventional practice. Fittings 36 and 38 are provided substantially at the center of connecting manifolds 14 and 20, respectively, the structure and function thereof being explained later in more detail.

Figure 2:
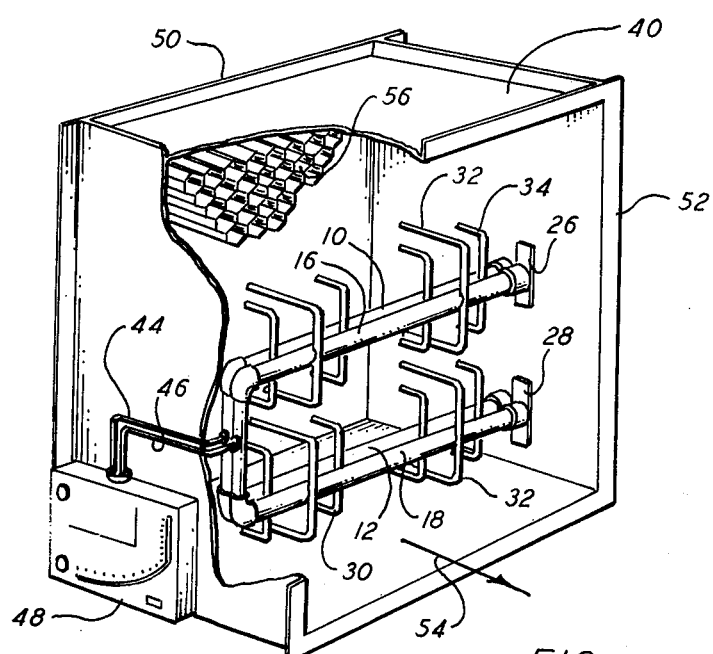
FIG. 2 is a perspective view, with portions broken away, of the apparatus of FIG. 1 mounted in a section of rectangular duct, as it would appear during use.

Referring now to FIG. 2, the sensing apparatus generally described above is shown mounted for use in a square or rectangular wall section 40, having peripheral flanges 42 and 44 at each end. The sensing apparatus is supported by fixed attachment of brackets 26 and 28 to one side of wall section 40, and by fittings 36 and 38 passing through the opposite side thereof. Wall section 40 is intended for permanent installation at a selected location in a heating or ventilating duct of the same cross section to provide an indication of air velocity therethrough. Although air velocity may not be uniform across section 40, measurement of the average total static pressures at a given plane will provide a reasonably close approximation of these pressures for purposes of determining the average velocity of air through the duct. For this purpose, lines 44 and 46 are connected at one end to fittings 36 and 38, respectively, to communicate the average total and static pressures from connecting manifolds 14 and 20 to opposite sides of a measuring instrument 48, such as an inclined manometer, which may be conveniently calibrated to read in cfm of air flow.

Wall section 40 is installed in the duct by attaching end flanges 50 and 52 to similar flanges provided for such purpose on th duct, a section thereof corresponding in length to wall section 40 being removed for installation of the sensing apparatus. Wall section 40 in effect becomes part of the duct, and installed so that air flow is in the direction of arrow 54. The upstream end of wall section 40 is filled with structure for removing turbulence from the air stream, a fragment of such structure indicated in FIG. 2 by reference numeral 56. Such practice is conventional in air flow measuring apparatus of the type of the present invention and may comprise, for example, an expanded aluminum structure of adjacent, hexagonal cells. The free open area of structure 56 is preferably in excess of 97% of the total area. Also, the velocity profile across the duct may be redeveloped by the linear drag coefficient introduced by the presence of structure 56. In any case, essentially parallel air flow at the static and total pressure sensing probes is provided.

Referring now to FIG. 3, the internal structure of manifolds 10 and 16 is shown in detail, that of manifolds 12 and 18 being identical thereto. Hollow sensing tubes 58 and 60 are respectively positioned within manifold tubes 10 and 16, coaxially thereof. Each tubes 58 and 60 is closed at the end supported by end caps 22, and open at the opposite end. Tubes 58 and 60 extend through internal end plugs 62 and 64, respectively, to communicate through their open ends with the interiors of connecting manifolds 14 and 20. Sensing tube 58 is provided with an opening 66 in the form of a sawed slot, or hole, through the tube wall at some point within manifold tube 10. Opening 68 is likewise provided in sensing tube 60 to communicate the interior of manifold tube 16 with the interior of sensing tube 60.

Figure 4:
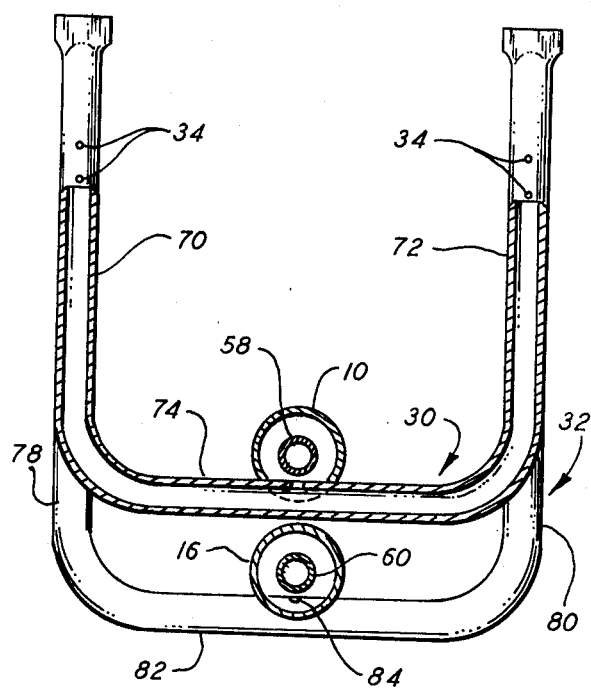
Figure 5:
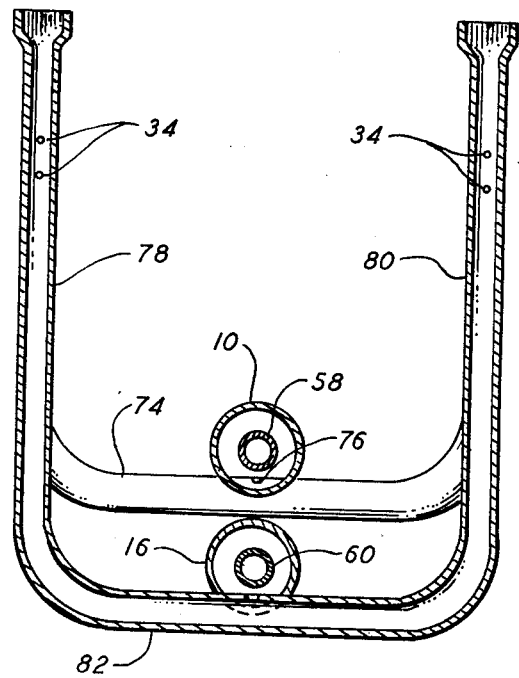

Turning now to FIGS. 4 and 5, the structure and association of the total and static pressure sensing probes with the respective manifold and sensing tubes is shown in greater detail. Each of total pressure sensor probes 30 includes a pair of parallel legs 70 and 72, joined by a medial section 74 having an axis substantially perpendicular to that of the legs. An opening is provided in the wall of manifold tube 10 to accommodate a portion of section 74, a soldered or other airtight connection being provided about the periphery of the opening in the manifold tube. Such opening may conveniently be formed with a milling tool having a radius equal to the external radius of the tubes of which the probes are formed, to a depth approximately equal to the radius of the probes. Small opening 76 (FIG. 5) is provided at the mid-point of section 74, i.e., an equal distance from the end of each leg.

Static sensor probes 32 also are formed with spaced, parallel legs 78 and 80, joined by perpendicular medial section 82, and are secured to manifold tube 16 about the entire periphery of an opening therein shaped to conform to the exterior of probes 32. Small opening 84 (FIG. 4) at the midpoint of section 82 provides communication of the interior of tubes 32 with the interior of manifold tube 16. As previously mentioned, the free ends of tubes 32, at the terminus of each leg, are closed, openings 34 being provided in opposite sides of both legs. The free ends of legs 70 and 72 are open and directed toward the upstream side of the unit, and terminate in a plane at or downstream of the plane of openings 34.

FIG. 6 illustrates in more detail the structure of fittings 36 and 38, through which the pressure in connecting manifolds 14 and 16 is communicated externally of the duct.

Thus, two sensing locations within the duct are provided by each of the U-shaped probes. No drilled openings are required in the manifold tubes, a single, milled opening being provided for connection of each double-ended sensor probe. The opening in the probe wall through which communication to the interior of the manifold is provided is small in relation to the milled opening in the manifold and is isolated from the periphery thereof, thus minimizing the likelihood of clogging the probe opening during connection of the probe to the manifold.

What is claimed is:

1. Means for communicating the pressure of a field within an enclosed space to a measuring instrument, said means comprising, in combination:
   a. a hollow, U-shaped sensing probe having first openings in both legs through which the interior of the enclosed space communicates with the interior of each leg of said probe;
   b. a hollow manifold tube of substantially larger internal cross section than said probe and having a second opening through a wall thereof;
   c. means fixedly connecting and effecting an air-tight seal between said probe, substantially at the midpoint between the legs thereof, and said manifold tube about the periphery of said second opening;
   d. said probe having a third opening through which the interior of each of said legs communicates with the interior of said manifold tube;
   e. a pressure measuring device; and
   f. means communicating the pressure within said manifold tube to said device.

2. The invention according to claim 1 wherein the ends of both legs of said U-shaped probe are closed and said first openings extend through the wall of both legs of said probe.

3. The invention according to claim 1 wherein the ends of both legs of said U-shaped probe are open to provide said first openings.

4. The invention according to claim 1 wherein said second opening comprises a milled slot in said manifold tube wall.

5. The invention according to claim 1 wherein said connecting means comprises a soldered connection between said U-shaped probe and said manifold tube around the entire periphery of said second opening.

6. The invention according to claim 1 and further including a plurality of said U-shaped probes connected at substantially evenly spaced intervals along the length of said manifold tube.

7. The invention according to claim 1 wherein the legs of said U-shaped probe are substantially parallel and are joined by a medial portion substantially perpendicular thereto, the connection of said probe to said manifold tube being such that the latter is mutually perpendicular to said legs and said medial portion.

8. The invention according to claim 4 wherein said U-shaped probe comprises a round tube, and said milled slot has a radius and depth substantially equal to the external radius of said probe.

9. The invention according to claim 1 wherein said third opening is substantially smaller than said second opening and is isolated from the periphery thereof.

* * * * *